(12) United States Patent
Zhang et al.

(10) Patent No.: US 11,618,085 B2
(45) Date of Patent: Apr. 4, 2023

(54) APPARATUS AND METHOD BASED ON SELECTIVE LASER MELTING TECHNIQUE FOR PREPARING FUNCTIONALLY GRADIENT MATERIAL

(71) Applicant: UNIVERSITY OF SCIENCE AND TECHNOLOGY BEIJING, Beijing (CN)

(72) Inventors: Baicheng Zhang, Beijing (CN); Lin Zhang, Beijing (CN); Shubin Ren, Beijing (CN); Mingli Qin, Beijing (CN); Xuanhui Qu, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 160 days.

(21) Appl. No.: 16/800,688

(22) Filed: Feb. 25, 2020

(65) Prior Publication Data

US 2020/0189001 A1 Jun. 18, 2020

Related U.S. Application Data

(63) Continuation of application No. PCT/CN2019/076890, filed on Mar. 4, 2019.

(30) Foreign Application Priority Data

Mar. 30, 2018 (CN) .......................... 201810292599.9

(51) Int. Cl.
*B33Y 30/00* (2015.01)
*B22F 12/58* (2021.01)
(Continued)

(52) U.S. Cl.
CPC .............. *B22F 12/49* (2021.01); *B22F 10/28* (2021.01); *B22F 12/58* (2021.01); *B22F 12/67* (2021.01);
(Continued)

(58) Field of Classification Search
CPC ................................. B22F 10/28; B22F 10/14
See application file for complete search history.

(56) References Cited

U.S. PATENT DOCUMENTS

| | | | | |
|---|---|---|---|---|
| 6,066,285 A | * | 5/2000 | Kumar | ................... B33Y 30/00 |
| | | | | 264/603 |
| 2017/0112601 A1 | | 4/2017 | Korten et al. | |
| 2018/0369917 A1 | * | 12/2018 | Mottin | .................... B22F 10/20 |
| 2020/0230941 A1 | * | 7/2020 | Swier | .................... G03G 15/224 |

FOREIGN PATENT DOCUMENTS

| | | |
|---|---|---|
| CN | 201109649 Y | 9/2008 |
| CN | 202062079 U | 12/2011 |

(Continued)

OTHER PUBLICATIONS

Translation of CN-106735219-A (Wang Anmin) (Year: 2017).*
Search Report of PCT/CN2019/076890.
Written Opinion of PCT/CN2019/076890.

*Primary Examiner* — Timothy Kennedy
*Assistant Examiner* — Farah Taufiq
(74) *Attorney, Agent, or Firm* — Novick, Kim & Lee, PLLC; Allen Xue

(57) ABSTRACT

A selective laser melting technology-based apparatus for preparing a gradient material, comprising a laser scanning array lens, and a powder storer, a powder mixer, a powder scraping plate, and a working platform that are provided in sequence from top to bottom; the powder storer is provided with two or more partitions; a bottom portion of the powder storer is provided with an outlet; the powder mixer is provided under the powder storer and is a horizontally provided rotational mixer; the powder scraping plate is disposed under the powder mixer; the working platform is provided under the powder scraping plate; the laser scanning array lens is provided on the working platform. The present invention further relates to a method for preparing a gradient (Continued)

material, comprising powder storing, powder scraping, powder mixing, powder laying, and printing. The method can guarantee the two-phase powder ratio in each layer of powder not change.

7 Claims, 2 Drawing Sheets

(51) Int. Cl.
  *B22F 12/67* (2021.01)
  *B22F 10/28* (2021.01)
  *B22F 12/49* (2021.01)
  *B22F 10/14* (2021.01)
(52) U.S. Cl.
  CPC ........... *B22F 10/14* (2021.01); *B22F 2301/15* (2013.01); *B22F 2301/205* (2013.01); *B22F 2301/35* (2013.01); *B33Y 30/00* (2014.12)

(56) References Cited

FOREIGN PATENT DOCUMENTS

| | | | |
|---|---|---|---|
| CN | 103173759 A | | 6/2013 |
| CN | 105154872 A | | 12/2015 |
| CN | 105386037 A | | 3/2016 |
| CN | 105562687 A | | 5/2016 |
| CN | 105772723 A | | 7/2016 |
| CN | 106180711 A | | 12/2016 |
| CN | 106378450 A | | 2/2017 |
| CN | 106735219 A | | 5/2017 |
| CN | 108480630 A | | 9/2018 |
| CN | 110369715 A | * | 10/2019 |
| EP | 2839905 A1 | | 2/2015 |
| JP | 2015183288 A | | 10/2015 |
| JP | 2018135210 A | * | 8/2018 |
| WO | 2015075539 A1 | | 5/2015 |
| WO | 2016183210 A1 | | 11/2016 |

* cited by examiner

APPARATUS AND METHOD BASED ON SELECTIVE LASER MELTING TECHNIQUE FOR PREPARING FUNCTIONALLY GRADIENT MATERIAL

CROSS-REFERENCE TO RELATED APPLICATIONS

This application is a bypass continuation application of PCT Application No. PCT/CN2019/076890. This Application claims priority from PCT Application No. PCT/CN2019/076890, filed Mar. 4, 2019 and CN Application No. 201810292599.9, filed Mar. 30, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The present invention relates to the field of metal additive manufacturing of functionally gradient materials, in particular to an apparatus and a method based on selective laser melting technique for preparing a functionally gradient material.

BACKGROUND OF THE INVENTION

With the development of science and technology, it is desirable that the two ends or different portions of a part have different properties or functions and the different properties or functions can be combined perfectly so as to avoid interfacial failure owing to mismatching between the physical properties under harsh service conditions. For example, a ceramic material with excellent heat resistance property is used for one side of the combustion chamber wall of the ramjet engine of a space shuttle that is exposed to the high-temperature gas at a temperature of thousands of degrees Celsius to endows the material with high heat resistance property, while a metal material is used for the other side of the combustion chamber wall to endow the material with high thermal conductivity and mechanical performance, and advanced material composition techniques are used to realize interface-free gradual transition of the material between the two interfaces by controlling the composition, tissue, and structure of the metal material and the ceramic material with respect to each other. Thus, the entire material has new functions with excellent heat resistance and high mechanical strength.

In recent years, as the additive manufacturing technology is developed, parts made of functionally gradient materials prepared with additive manufacturing technology have received extensive concern gradually in the aviation and medical industries. The additive manufacturing technology is a sort of manufacturing technology that accumulates the material into a desired shape gradually, and has advantages such as material saving, fast processing speed, and support for processing parts in complex shapes, etc., when compared with the traditional subtractive processing method. Among numerous additive manufacturing techniques, the Laser Metal Deposition (LMD) technique was first used to prepare functionally gradient materials, because it can realize continuous proportional change of powder composition in the manufacturing process. For example, the Chinese Patent No. 201510560572.X has disclosed a laser manufacturing method for preparing a nickel-based high-temperature-resistant functionally gradient material on a titanium material, which is mainly used for preparing a high-temperature-resistant layer for the titanium material to improve the high-temperature properties of the titanium material. However, there are few reports on the application of selective laser melting/sintering (SLM/SLS) technique, which is regarded as the latest and most promising additive manufacturing technique, in the manufacturing of functionally gradient materials. The selective laser melting/sintering technique is one of additive manufacturing (AM) techniques. With the selective laser melting/sintering technique, 3D digital model hierarchy slicing is utilized to form a scanning trace, powder is laid in a processing area and melted by laser scanning, and the material is shaped into a desired shape by adding the powder layer by layer, so as to obtain a final product. The selective laser melting/sintering technique is very suitable for manufacturing parts with complex and fine structures. However, the selective laser melting/sintering technique doesn't support continuous replacement of powder in the powder layer accumulation process, and doesn't support laying two or more phases of powder orderly in the powder laying process. Consequently, at present, the researchers can only produce "functionally gradient materials" by replacing the powder in a layer by layer manner. Such a method not only is unable to produce functionally gradient materials in the traditional sense, but also can't avoid the problems such as powder oxidation and excessive exposure of the operator to the harmful powder, etc. in the manufacturing process. As a result, it is unable to give play to the capability of the selective laser melting technique for processing large-size parts in complex shapes at high accuracy in preparation of functionally gradient materials. In view of the above problems, the present invention aims at developing a process and a method for preparing functionally gradient materials with selective laser melting technique, in order to improve the level of manufacturing of functionally gradient materials.

Therefore, a heretofore unaddressed need exists in the art to address the aforementioned deficiencies and inadequacies.

SUMMARY OF THE INVENTION

To overcome the drawbacks in the prior art, the present invention provides an apparatus and a method based on selective laser melting technique for preparing a functionally gradient material, which utilize a powder storer with a combined structure in a shape consisting of two or more triangles to achieve gradient mixing of two or more powder components, and then prepare a functionally gradient material with continuous proportional change of material composition through powder mixing, powder laying, and laser melting.

The technical scheme of the present invention is as follows:

An apparatus based on selective laser melting technique for preparing a functionally gradient material, comprising a laser scanning array lens, and a powder storer, a powder mixer, a powder scraping plate, and a working platform that are disposed in sequence from top to bottom;

The powder storer is provided with 2 or more partitions, which are used to contain different kinds of powder; the bottom of the powder storer is provided with an outlet, and the different kinds of powder are mixed at a gradient ratio after passing through the outlet;

The powder mixer is disposed under the powder storer and is a rotational mixer arranged horizontally; the powder mixed at a gradient ratio remains in the gradient mixed state in the powder mixer;

The powder scraping plate is disposed under the powder mixer; the working platform is disposed under the powder scraping plate; the laser scanning array lens is disposed on the working platform.

Furthermore, the powder storer is generally in a cuboid shape; in a case of 2 kinds of powder, the cross section of the powder storer consists of two triangles reversed from each other; in a case of 3 kinds of powder, the cross section of the powder storer consists of three symmetrical triangles; in a case of 4 kinds of powder, the cross section of the powder storer consists of four triangles combined together.

Furthermore, the outlet in the bottom of the powder storer is a rectangular outlet movable along the bottom of the powder storer, and the powder will fall from the powder storer into the powder mixer when the outlet is moved from one end of the powder storer to the other end of the powder storer.

Furthermore, the powder mixer is generally in a cylindrical shape and placed horizontally.

Furthermore, the powder scraping plate comprises a powder laying groove for holding the powder and a powder laying blade for powder laying.

Furthermore, the functionally gradient material is a material for metal additive manufacturing.

Furthermore, the functionally gradient material is an iron-based material, nickel-based material, or titanium-based material.

The present invention further provides a method for preparing a functionally gradient material with the above-mentioned apparatus, which comprises:

powder storage: placing different kinds of powder in corresponding partitions of the powder storer respectively;

powder scraping: a movable rectangular outlet is provided in the bottom of the powder storer, the different kinds of powder falls from the powder storer at a preset ratio accordingly into the cylindrical powder mixer arranged horizontally when the movable rectangular outlet is moved from one end of the powder storer to the other end of the powder storer, and thereby form gradient powder;

powder mixing: closing the powder mixer and driving it to rotate for mixing after the powder falls into the powder mixer, opening the powder mixer with the opening of the powder mixer facing downward after the mixing, so that the mixed powder falls into the powder scraping plate under a gravity action;

powder laying: pushing the powder mixed at a gradient ratio with the powder scraping plate onto the working platform;

printing: melting the layer of powder by scanning with a laser beam under the control of the laser scanning array lens after the powder is laid on the working platform;

repeating powder scraping, powder mixing, powder laying, and printing steps, so as to prepare a part of functionally gradient material finally.

Furthermore, the gradient ratio of the gradient powder remains constant in the axial direction of the powder mixer in the powder mixing process.

The present invention attains the following beneficial effects: compared with the existing selective melting methods for preparing functionally gradient materials, the apparatus and method provided in the present invention change the gradient change direction of a functionally gradient material from a parting manufacture direction extending vertically in traditional additive manufacturing to a horizontal direction perpendicular to the powder laying direction, ensure that the mix ratio of the two-phase powder in each layer of powder doesn't vary as the height of the layer is increased through powder storage-powder mixing-powder laying procedures, maintain the stability of the powder layers, and provide a basis for processing large-size functionally gradient material with a continuously varying mix ratio.

BRIEF DESCRIPTION OF DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

FIG. 2 is a schematic structural diagram of the apparatus in the present invention, wherein FIG. 2a is a front sectional view, and FIG. 2b is a side sectional view;

Figure 1:
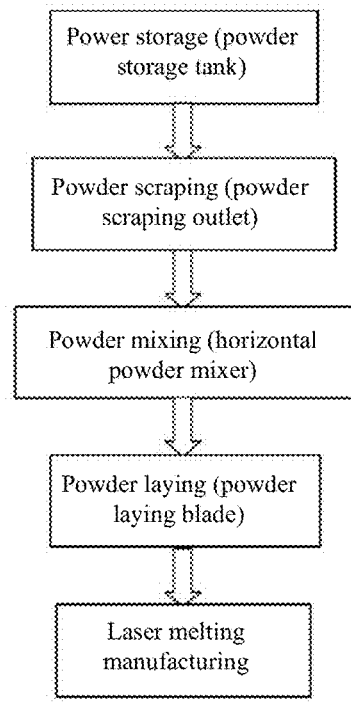
FIG. 1 is a block diagram of the process flow of the method based on selective laser melting technique for preparing a functionally gradient material in an embodiment of the present invention.

In the Figures: 1—powder storer; 2—outlet; 3—powder mixer; 4—powder scraping plate; 5—working platform; 6—laser scanning array lens.

DETAILED DESCRIPTION OF THE EMBODIMENTS

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Hereunder the embodiments of the present invention will be detailed with reference to the accompanying drawings. It should be noted that the technical features or combinations of technical features described in the following embodiments shall not be deemed as separate ones; instead, they may be combined with each other to attain a better technical effect. In the accompanying drawings mentioned in the following embodiments, identical features or components are represented by the same symbols, and those symbols may be applied in different embodiments.

Figure 2:
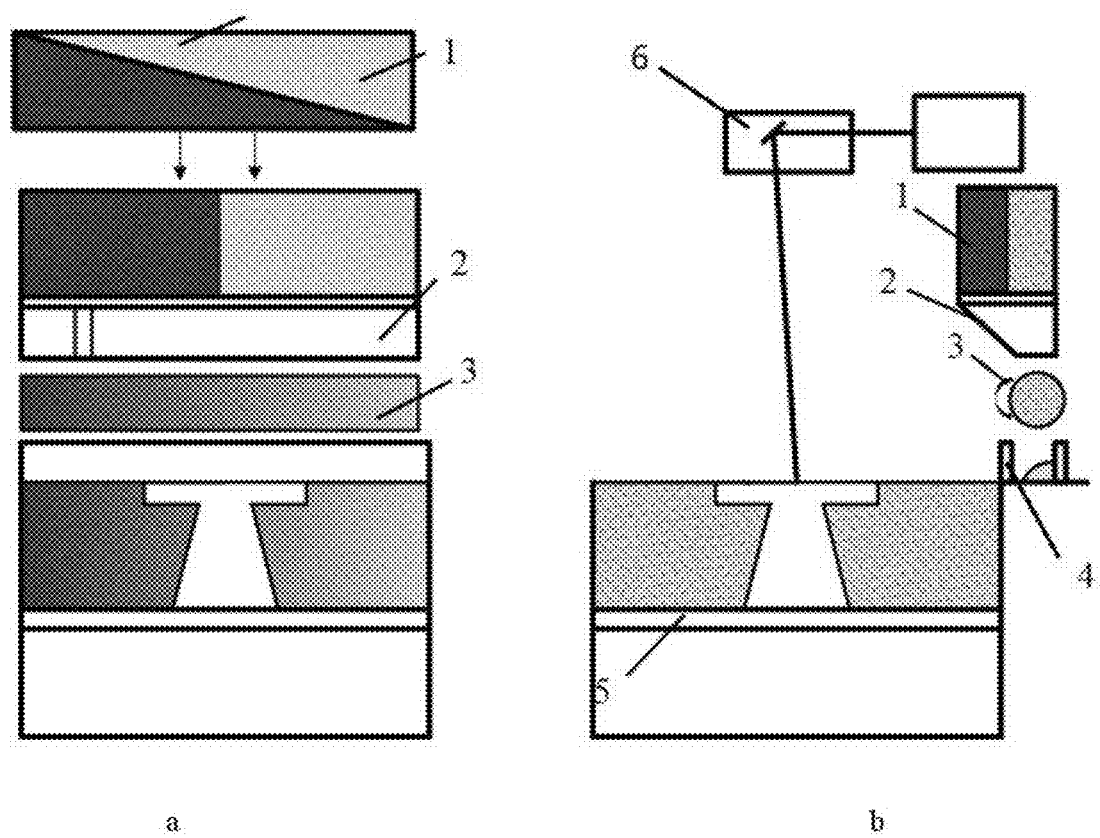

As shown in FIG. 2, an apparatus based on selective laser melting technique for preparing a functionally gradient material, comprising a laser scanning array lens 6, and a powder storer 1, a powder mixer 3, a powder scraping plate 4, and a working platform 5 that are disposed in sequence from top to bottom, wherein the powder storer 1 is provided with 2 or more partitions, which are used to contain different kinds of powder; the bottom of the powder storer 1 is provided with an outlet 2, and the different kinds of powder are mixed at a gradient ratio after passing through the outlet 2; the powder mixer 3 is disposed under the powder storer 1 and is a rotational mixer arranged horizontally; the powder mixed at a gradient ratio remains in the gradient mixed state in the powder mixer 3; the powder scraping plate 4 is disposed under the powder mixer 3; the working platform 5 is disposed under the powder scraping plate 4; the laser scanning array lens 6 is disposed on the working platform 5, and the working platform 5 can move up and down.

Figure 3:
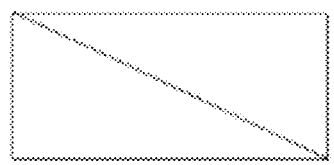
FIG. 3 is a schematic diagram illustrating the cross-sectional shape of a powder storer containing 2 phases of powder.
Figure 4:
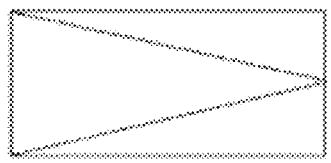
FIG. 4 is a schematic diagram illustrating the cross-sectional shape of a powder storer containing 3 phases of powder.
Figure 5:
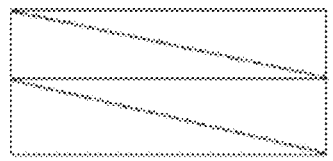
FIG. 5 is a schematic diagram illustrating the cross-sectional shape of a powder storer containing 4 phases of powder.

Preferably, the powder storer 1 is generally in a cuboid shape; in a case of 2 kinds of powder (two phases), the cross section of the powder storer 1 consists of two triangles reversed from each other, as shown in FIG. 3; in a case of 3 kinds of powder (three phases), the cross section of the powder storer 1 consists of three symmetrical triangles, as shown in FIG. 4; in a case of 4 kinds of powder (four phases), the cross section of the powder storer 1 consists of four triangles combined together, as shown in FIG. 5.

Preferably, the outlet 2 in the bottom of the powder storer 1 is a rectangular outlet movable along the bottom of the powder storer 1, and the powder will fall from the powder storer 1 into the powder mixer 3 when the outlet 2 is moved from one end of the powder storer 1 to the other end of the powder storer 1.

Preferably, the powder mixer 3 is generally in a cylindrical shape and placed horizontally.

Preferably, the powder scraping plate 4 comprises a powder laying groove for holding the powder and a powder laying blade for powder laying.

The functionally gradient material is a material for metal additive manufacturing, such as an iron-based material, nickel-based material, or titanium-based material.

As shown in FIG. 1, the method for preparing a functionally gradient material with the above-mentioned apparatus according to an embodiment of the present invention comprises:

powder storage: placing different kinds of powder in corresponding partitions of the powder storer 1 respectively; in a case that the powder consists of two phases, the partitions of the powder storer 1 are the partitions as shown in FIG. 3; in a case that the powder consists of three phases, the partitions are the partitions as shown in FIG. 4; in a case that the powder consists of four phases, the partitions are the partitions as shown in FIG. 5;

powder scraping: a movable rectangular outlet 2 is provided in the bottom of the powder storer 1, the different kinds of powder (2 kinds in this embodiment) falls from the powder storer 1 at a preset ratio accordingly into the cylindrical powder mixer 3 arranged horizontally when the movable rectangular outlet 2 is moved from one end of the powder storer 1 to the other end of the powder storer 1, and thereby form gradient powder;

powder mixing: closing the powder mixer 3 and driving it to rotate for mixing after the powder falls into the powder mixer 3, opening the powder mixer 3 with the opening of the powder mixer 3 facing downward after the mixing, so that the mixed powder falls into the powder laying groove of the powder scraping plate 4 under a gravity action; since the powder mixer 3 is disposed horizontally and can roll, the gradient powder can be mixed intensively and homogeneously in the powder mixer 3 and the gradient ratio of the gradient powder remains constant in the axial direction of the powder mixer 3 in the powder mixing process;

powder laying: after the working platform 5 is lowered by the height of one layer, scraping the powder of functionally gradient material onto the working platform 5 (the base plate of a working chamber) with the powder laying blade, so as to lay the powder of functionally gradient material;

printing: melting the layer of powder by scanning with a laser beam under the control of the laser scanning array lens 6 after the powder is laid on the working platform 5;

repeating the above powder scraping, powder mixing, powder laying, and printing steps, so as to prepare a part of functionally gradient material finally.

The traditional method for preparing functionally gradient materials only supports "layer-by-layer powder replacement". Consequently, in the obtained final product, though the gradients of the layers are different from each other, it is unable to realize continuous gradient change. With the apparatus and method provided in the present invention, continuous transition in the functionally gradient material can be realized, and the gradient change direction of the functionally gradient material is changed from the part manufacturing direction extending vertically in traditional additive manufacturing to a horizontal direction perpendicular to the powder laying direction, and the mix ratio of the two-phase powder in each layer of powder doesn't vary as the height of the layer is increased through powder storage-powder mixing-powder laying procedures, and the stability of the powder layers are maintained.

While some embodiments of the present invention have been described above, those skilled in the art should appreciate that various modifications can be made to those embodiments without departing from the spirit of the present invention. Those embodiments are only exemplary, and shall not be deemed as constituting any limitation to the scope of protection of the present invention.

The invention claimed is:

1. An apparatus for selective laser melting for preparing a functionally gradient material, comprising:
    a laser scanning array lens, a powder storage bin, a powder mixer, a powder scraping plate, and a working platform,
    wherein the powder storage bin has a cross-sectional area that is rectangular in shape, and comprises one or more partition walls extending from top to bottom of the powder storage bin and partitioning the powder storage bin into two or more sections, a first section storing a first powder, a second section storing a second powder, wherein a bottom of the powder storage bin is provided with an outlet having a rectangular opening that extends across all of the two or more sections in the powder storage bin in a first direction and is configured to move along the bottom of the powder storage bin in a second direction so that, during operation, a powder mixture comprising the first powder and the second powder passes through the outlet into the powder mixer, wherein the powder mixer is a rotational drum arranged horizontally and has a rotational axis parallel to an edge of the outlet of the powder storage bin, the powder mixer has an opening that receives the powder mixture from the outlet of the powder storage bin, and, during operation, the powder mixer further mixes the powder mixture inside the powder mixer by rotation around the rotational axis so that the powder mixture maintains a gradient along the rotational axis of the powder mixture, and the powder scraping plate has a powder laying groove that receives the powder mixture from the powder mixer and a powder laying blade that is movable along a surface of the working platform to spread the powder mixture over the working platform, and wherein the laser scanning array lens is disposed above the working platform.

2. The apparatus according to claim 1, wherein the powder storage bin is a cuboid having one partition wall arranged to diagonally partitioning the storage bin from top to bottom into two triangular prism sections reversed from each other.

3. The apparatus according to claim 1, wherein the functionally gradient material is a material for metal additive manufacturing.

4. The apparatus according to claim 1, wherein the powder mixture comprises iron, nickel, or titanium.

5. The apparatus according to claim 1, wherein the powder storage bin is a cuboid having two partition walls, each partition wall having a first edge contacting a first wall of the powder storage bin and a second edge contacting a same position on a second wall of the powder storage bin opposite to the first wall, so that the two partition walls partitioning the powder storage bin from top to bottom into a first section, a second section, and a third section that contain the first powder, the second powder, and a third powder, respectively, wherein the outlet extends across the first section, the second section, and the third section, and is movable between the first wall and the second wall of the powder storage bin, and, during operation, the powder mixture passing through the outlet of the powder storage bin contains the first powder, the second powder, and the third powder.

6. The apparatus according to claim 1, wherein the powder storage bin is a cuboid having three partition walls, each partition wall having a first edge contacting the first wall of the powder storage bin and a second edge contacting a second wall of the powder storage bin opposite to the first wall, so that the three partition walls partitioning the powder storage bin from top to bottom into a first section, a second section, a third section, and a fourth section that contain the first powder, the second powder, a third powder, and a fourth powder, respectively, wherein the outlet extends across the first section, the second section, the third section, and the fourth section, and is movable between the first wall and the second wall of the powder storage bin, and, during operation, the powder mixture passing through the outlet of the powder storage bin contains the first powder, the second powder, the third powder, and the fourth powder.

7. A method for preparing a functionally gradient material with the apparatus of claim 1, comprising:

storing the first powder in the first section of the powder storage bin and the second powder in the second section of the powder storage bin;

moving the outlet having the rectangular opening that extends across all of the two or more sections in the powder storage bin along the bottom of the powder storage bin so that the first powder and the second powder pass through the outlet simultaneously into the powder mixer;

rotating the powder mixer around the rotational axis parallel to a moving direction of the outlet to form the powder mixture having a gradient along the rotational axis of the powder mixture;

disposing the powder mixture from the powder mixer onto the scraping plate;

moving the powder laying blade along the surface of the working platform to spread a layer of the powder mixture over the working platform, and melting the layer of powder mixture using the laser beam to form a sintered layer of the functionally gradient material.

\* \* \* \* \*